US010447112B2

(12) United States Patent
Capoulun et al.

(10) Patent No.: US 10,447,112 B2
(45) Date of Patent: Oct. 15, 2019

(54) ELECTRIC FAN SET AND CORRESPONDING HEATING, VENTILATION AND/OR AIR CONDITIONING INSTALLATION FOR A MOTOR VEHICLE

(71) Applicant: Valeo Systemes Thermiques, Le Mesnil Saint Denis (FR)

(72) Inventors: Geoffroy Capoulun, Versailles (FR); Morgan Le Goff, Espinay-sur-Orge (FR); Alain Farkh, Montfort l'amaury (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 141 days.

(21) Appl. No.: 15/335,687

(22) Filed: Oct. 27, 2016

(65) Prior Publication Data

US 2017/0126096 A1 May 4, 2017

(30) Foreign Application Priority Data

Oct. 29, 2015 (FR) ...................................... 15 60359

(51) Int. Cl.

| | |
|---|---|
| ***H02K 5/15*** | (2006.01) |
| ***H02K 5/16*** | (2006.01) |
| ***H02K 5/22*** | (2006.01) |
| ***H02K 7/14*** | (2006.01) |
| ***H02K 11/30*** | (2016.01) |
| ***F04D 25/06*** | (2006.01) |
| ***F04D 29/62*** | (2006.01) |
| ***H02K 11/33*** | (2016.01) |
| ***B60H 1/00*** | (2006.01) |

(52) U.S. Cl.
CPC ........... *H02K 7/14* (2013.01); *B60H 1/00507* (2013.01); *F04D 25/0606* (2013.01); *F04D 25/068* (2013.01); *F04D 29/626* (2013.01); *H02K 5/15* (2013.01); *H02K 5/16* (2013.01); *H02K 5/225* (2013.01); *H02K 11/30* (2016.01); *H02K 11/33* (2016.01)

(58) Field of Classification Search
CPC ............ H02K 5/16; H02K 5/225; H02K 7/14; H02K 11/30; H02K 11/33; H02K 5/15; B60H 1/00507; F04D 29/626; F04D 25/0606; F04D 25/068
USPC ................................................ 310/91, 71, 89
See application file for complete search history.

(56) References Cited

U.S. PATENT DOCUMENTS 5,910,716 A * 6/1999 Olsen ........................ H02P 6/34 318/272
5,932,942 A * 8/1999 Patyk ..................... H02K 11/33 310/58

(Continued)

*Primary Examiner* — John K Kim
(74) *Attorney, Agent, or Firm* — Osha Liang LLP

(57) ABSTRACT

The invention relates to an electric fan set, notably for a motor vehicle heating, ventilation and/or air conditioning installation, comprising:
- a motor,
- a motor support (11), and
- a control module support (23) forming a bearing support for the motor.

According to the invention, the motor support (11) and the control module support (23) each comprise at least one fixing zone, the fixing zones being able to cooperate with one another for the assembly of the motor support (11) with the control module support (23), according to at least two different positions of the motor support (11) relative to the control module support (23).

14 Claims, 4 Drawing Sheets

(56) References Cited

U.S. PATENT DOCUMENTS

| | | | | |
|---|---|---|---|---|
| 8,659,193 | B2 * | 2/2014 | Yamasaki | H02K 11/33<br>310/64 |
| 10,298,085 | B2 * | 5/2019 | Capoulun | F04D 29/4226 |
| 2006/0255671 | A1 * | 11/2006 | Tang | F04D 25/08<br>310/89 |
| 2011/0254393 | A1 * | 10/2011 | Yamasaki | H02K 5/18<br>310/64 |
| 2012/0098365 | A1 * | 4/2012 | Yamasaki | B62D 5/0406<br>310/71 |
| 2012/0161558 | A1 * | 6/2012 | Yamasaki | H02K 5/225<br>310/71 |
| 2017/0126096 | A1 * | 5/2017 | Capoulun | H02K 7/14 |

* cited by examiner

Fig.1
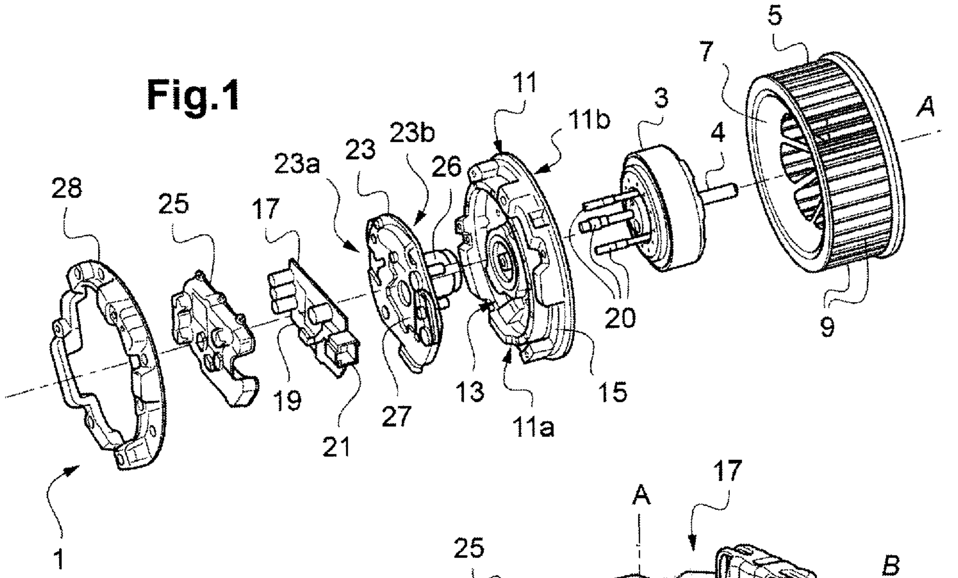
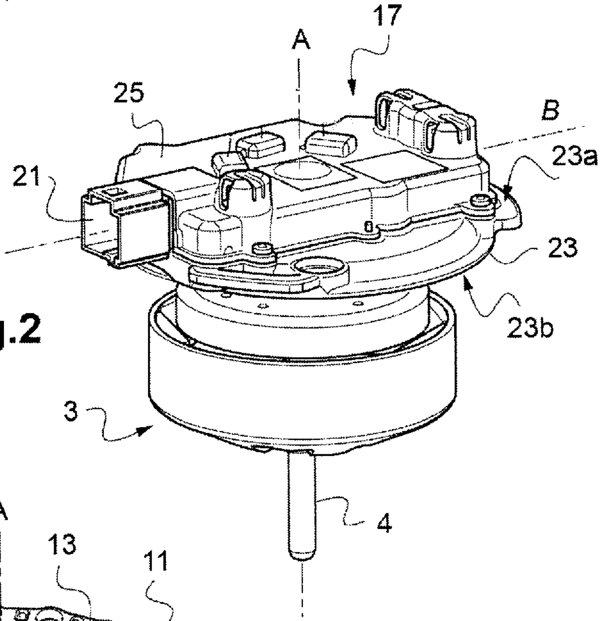
Fig.2
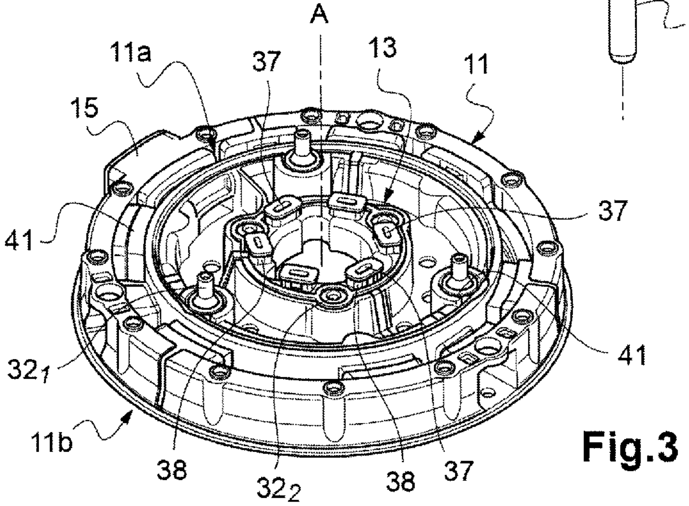
Fig.3

ELECTRIC FAN SET AND CORRESPONDING HEATING, VENTILATION AND/OR AIR CONDITIONING INSTALLATION FOR A MOTOR VEHICLE

The invention relates to the field of ventilation, heating and/or air conditioning installations. The invention relates in particular to an electric fan set, notably for such an installation.

A vehicle heating, ventilation and/or air conditioning installation, notably of a motor vehicle, is generally used to distribute air in the vehicle interior. In such an installation, the circulating flow of air is propelled by an electric fan set, also called propellant, notably comprising a fan wheel and an electric motor capable of rotating the fan wheel.

The electric fan set also comprises a motor support, secured to a housing of the heating, ventilation and/or air conditioning installation, capable of bearing the motor of the electric fan set.

Conventionally, the motor is driven by a control module notably comprising a control circuit making it possible to power the windings of the motor and an electrical connector making it possible in particular to bring to this control circuit the energy and/or control signals. According to one known solution, a control module support bears this control module. It is known that this control module support also performs the function of bearing support for the motor.

In order to allow for an assembly of the electric fan set, the motor support and the control module support are generally assembled together in a fixed position, with the electrical connector being able to extend parallel or orthogonally relative to main extension planes of the motor support and of the control module support which are parallel to one another. For bulk reasons, the electrical connector preferably extends parallel relative to the main extension planes of the motor support and of the control module support. Furthermore, the electrical connector extends in a fixed direction relative to the housing on which the electric fan set is mounted.

The designers usually make a preliminary choice of allowing the electric fan set to be mounted on the motor vehicle with a predefined specific orientation of the electrical connector depending on the application. The layout of the electric fan set on the housing of the vehicle must take into account a number of parameters such as, in particular, the risk of ingress of water into the electrical connector of the control module, the bulk, or even the mounting of the electric fan set in the vehicle, in particular the connection of the electrical connector to the wiring loom of the vehicle. In effect, it is preferable for the electric fan set to be arranged in such a way that the electrical connector is oriented downwards according to the arrangement on the vehicle to avoid the ingress of water. Moreover, on the assembly line, an operator needs to be able to easily access the electrical connector, so it is important for cables or other connectors not to prevent the operator from accessing the electrical connector of the motor control module of the electric fan set.

According to the known solutions, the electric fan set is designed specifically for each application, so as to conform in particular to a specific electric connector orientation, which is a critical point for the integration on the vehicle.

Consequently, for each type of heating, ventilation and/or air conditioning installation, it is necessary to adapt the entire electric fan set. In particular, the motor support, or more specifically the interface of the motor support with the housing of the vehicle, needs to be modified. Now, it may involve a complicated part, the redesigning and/or the modifying of which may prove lengthy.

The lack of flexibility proves restrictive and requires the electric fan set to be mounted exclusively according to a specific choice previously defined according to the needs of the motor vehicle constructor.

The aim of the invention is therefore to at least partially mitigate these problems of the prior art by proposing an electric fan set, the assembly and the mounting on the vehicle of which can be adapted according to the needs of the motor vehicle constructor.

To this end, the subject of the invention is an electric fan set for a motor vehicle heating, ventilation and/or air conditioning installation, comprising:

- a motor,
- a motor support, and
- a control module support forming a bearing support for the motor, characterized in that the motor support and the control module support each comprise at least one fixing zone, the fixing zones being able to cooperate with one another for the assembly of the motor support with the control module support, according to at least two different positions of the motor support relative to the control module support.

In other words, the fixing zones of the motor support and of the control module support are configured in such a way that the motor support and the control module support can be assembled with one another according to at least two different positions.

The motor is notably a brushless motor or an electrically switched motor.

Thus, there are at least two, preferably three, possible assembly positions between the motor support and the control module support. During assembly, it is possible to define the orientation of the electric fan set relative to the housing of the vehicle and, consequently, the position in which to assemble the motor support and the control module support.

Each fixing zone comprises all the mounting functionalities making it possible to assemble the motor support with the control module support. In particular, the fixing zones can be capable of receiving one or more mounting elements which can be chosen from: screws or screw-nut assemblies or even rivets. As a variant, or in complement, the assembly can be done by material deformation in the complementary fixing zones facing one another.

According to one aspect of the invention, the motor support and the control module support have parallel main extension planes, and the fixing zone of at least one of the supports is invariant by rotation by a predefined angle about an axis substantially orthogonal to the main extension planes.

Advantageously, the fixing zones of the two supports, that is to say of the motor support and of the control module support, are invariant by rotation by a predefined angle about the axis substantially orthogonal to the main extension planes.

The two groups of parts respectively borne by the motor support and the control module support can turn relative to one another to be placed in the chosen assembly position.

According to an additional aspect of the invention, the predefined angle is 120°.

According to an additional aspect of the invention, at least one fixing zone of the motor support and/or of the control module support comprises at least two sets of mounting elements.

According to a particular aspect of the invention, each set of mounting elements is the image of another set of mounting elements by rotation by the predefined angle about the axis substantially orthogonal to the main extension planes.

The control module support and the motor support can thus be assembled with one another according to a number of positions and the assembly is done with a number of fixing points, which makes it possible to increase the robustness of this assembly.

Preferably, the motor support comprises three sets of mounting elements and the control module support also comprises three sets of mounting elements.

Thus, the motor support and the control module support can be assembled according to three different assembly positions, which makes it possible to meet different needs as to the layout of the electric fan set on the vehicle, notably in relation to the orientation of an electrical connector which would be borne by the control module support. Furthermore, with three fixing points between the motor support and the control module support, the assembly is robust.

According to an additional aspect of the invention, the sets of mounting elements of a fixing zone of a support are distributed according to a constant angular offset. Advantageously, there are three sets of mounting elements of the motor support and of the control module support and they are distributed according to an angular offset of the order of 120°. There is thus an assurance of an adequate number of assembly positions between the motor support and the control module support to meet the needs of the layout on the vehicle, while guaranteeing a robust assembly.

This configuration is particularly suited to a substantially circular form of the motor support and of the control module support.

According to a preferred embodiment, the control module of the motor comprises at least one electrical connector extending substantially parallel to the main extension plane of the control module support, and the fixing zones of the motor support and of the control module support are configured such that the electrical connector extends in a distinct direction in each assembly position of the motor support and of the control module support.

The electrical connector arranged parallel to the extension planes of the motor support and of the control module support makes it possible to save in bulk. Furthermore, the invention makes it possible to have at least two, preferably three, different positions of the electrical connector without requiring the parts of the electric fan set to be modified. There is no longer a need to redesign the motor support for example to adapt the electric fan set in terms of orientation of the electrical connector once assembled with the vehicle.

According to a particular embodiment, the control module support hears a control circuit, and the fixing zone of the control module support comprises mounting elements arranged jointly on the control module support and on the control circuit. In other words, associated mounting elements are arranged both on the control module support and on the control circuit.

According to another aspect of the invention, the fixing zones of the motor support and of the control module support have complementary mounting elements, of which at least some are configured to allow the motor support to be fixed to the control module support and are chosen from the following list: screws, screw-nut assemblies, rivets, orifices, fixing blocks.

According to yet another aspect of the invention, the control module support bears a control module comprising a predetermined number of terminals connected to the motor, and the fixing zones of the motor support and of the control module support have complementary mounting elements, of which at least some are configured to allow the passage of the terminals through the motor support and the control module support.

According to another aspect of the invention, the control module support comprises first openings for the passage of the terminals, there being the same number of first openings as there are terminals. The motor support comprises second openings for the passage of the terminals, the number of which is determined according to the number of terminals and the number of possible assembly positions between the motor support and the control module support.

The electric fan set comprises, for example, three terminals connected between the control module and the motor, and the motor support and the control module support can be assembled with one another according to three different positions. The motor support comprises, according to this example, six second openings for the passage of the three terminals according to the three assembly positions between the motor support and the control module support.

According to a particular embodiment,

- the motor support comprises parts forming protuberances relative to the motor support and extending towards the control module support, said protruding parts having second openings for the passage of the terminals, and
- the control module support further comprises cavities in which certain protruding parts of the motor support emerge.

Thus,

- on the one hand, the protruding parts of the motor support which are passed through by the terminals emerge in the first openings of the control module support, whereas
- on the other hand, the protruding parts of the motor support not passed through by the terminals emerge in corresponding cavities of the control module support.

Advantageously, the control module support comprises a means for cooling the control module, such as a heat sink, which makes it possible to discharge and/or dissipate the heat produced by the components of the control module.

The invention relates also to a heating, ventilation and/or air conditioning installation for a motor vehicle, characterized in that it comprises at least one electric fan set as defined previously.

Thus, one and the same electric fan set can be assembled according to different positions relative to said installation, notably a housing of said installation receiving this electric motor set. In particular, the control module support can be assembled with the motor support according to different orientations relative to this motor support, notably forming an interface between the electric fan set and said installation.

Other features and advantages of the invention will become more clearly apparent on reading the following description, given as an illustrative and non-limiting example, and the attached drawings in which:

FIG. 1 is an exploded view of an electric fan set according to the invention, FIG. 2 is a perspective view showing a motor, a control module and a control module support of the electric fan set of FIG. 1, FIG. 3 is a perspective view of a motor support of the electric fan set of FIG. 1, FIG. 4 is an exploded view of the motor support and of the control module support before assembly, FIG. 5*a* schematically represents a plan view of the control module support assembled with the motor support according to a first position, FIG. 5*b* schematically represents a plan view of the control module support assembled with the motor support according to a second position different from the first position of FIG. 5*a,*

FIG. 5*c* schematically represents a plan view of the control module support assembled with the motor support according to a third position different from the first and second positions of FIGS. 5*a* and 5*b,*

In these figures, the identical elements bear the same references.

Figure 5A:
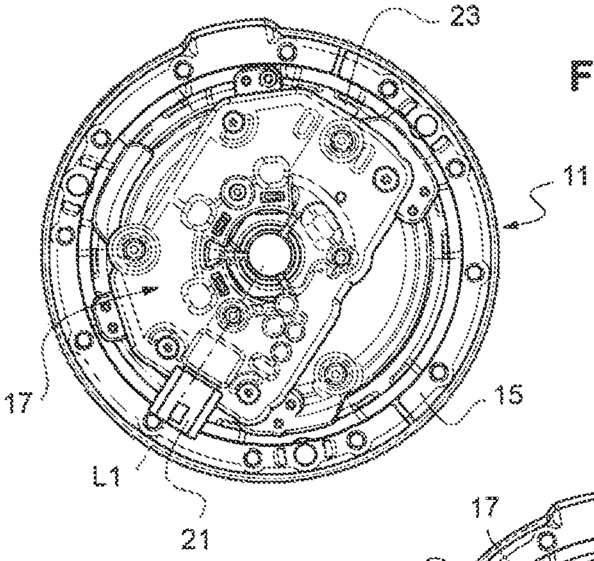

The following embodiments are examples. Although the description refers to one or more embodiments, this does not necessarily mean that each reference relates to the same embodiment or that the features apply only to a single embodiment. Simple features of different embodiments can also be combined to provide other embodiments.

In the description, certain elements may be indexed, in other words, a first element or a second element may for example be mentioned. In this case, it is a simple indexing to differentiate and name elements that are similar but not identical. This indexing does not imply a priority of one element over another. Such denominations can easily be interchanged without departing from the scope of the present invention.

FIG. 1 shows an exploded view of an electric fan set 1, also called propellant, for example for a heating, ventilation and/or air conditioning installation with which a motor vehicle is equipped. The electric fan set 1 is therefore intended to be mounted on a housing of the heating, ventilation and/or air conditioning installation (not visible in the figures).

In this case, the electric fan set 1 is arranged in such a way as to make a flow of air circulate in a duct of the heating, ventilation and/or air conditioning installation. It can be an external flow of air taken from the outside of the vehicle interior, or a flow of air taken from inside the vehicle interior, called recycled air flow, or even a mix of a flow of outside air and a flow of recycled air. The air duct of the heating, ventilation and/or air conditioning installation distributes the flow of air to outlet orifices (not represented) opening into the vehicle interior.

To this end, the electric fan set 1 comprises a motor 3 and a fan wheel 5 intended to be driven by the motor 3, so as to ensure the setting in motion of the flow of air. The motor is in particular a brushless motor 3.

More specifically, the motor 3 comprises a fixed stator and a rotor that is mobile relative to the stator and capable of driving the fan wheel 5. In the mounted state of the electric fan set 1, for example on a housing of the heating, ventilation and/or air conditioning installation, the stator of the motor 3 is fixed relative to this housing.

Referring to the exemplary embodiment illustrated in FIGS. 1 and 2, the motor 3 extends about a longitudinal axis A, corresponding to the axis of rotation of the motor 3, and comprises a transmission shaft 4 extending along the longitudinal axis A. The transmission shaft 4 is for example arranged substantially at the centre of the motor 3. In this example, the transmission shaft 4 protrudes from the motor 3, thus having a free end.

The motor 3 and the fan wheel 5 are coaxial. The fan wheel 5 is mounted on the transmission shaft 4 of the motor 3.

According to a particular exemplary embodiment visible in FIG. 1, the fan wheel 5 has, for its part, a part 7 substantially of bowl form; this part is hereinafter designated bowl 7. The bowl 7 is of substantially concave form. Furthermore, the fan wheel 5 can have a flat formed at the periphery of the bowl 7, on the side intended to cooperate with a motor support 11 described hereinbelow. In other words, the bowl 7 is terminated by this flat. The flat extends, in this example, substantially orthogonally relative to the axis A.

The fan wheel 5 further comprises a central hub, for receiving the free end of the transmission shaft 4 of the motor 3. The fan wheel 5 can have a generally substantially cylindrical form comprising blades or fins 9 extending in this example from the periphery of the bowl 7, in a direction substantially parallel to the longitudinal axis A of the motor 3. In other words, according to the particular embodiment illustrated, the blades or fins 9 extend away from the flat at the periphery of the bowl 7 and substantially orthogonally relative to this flat.

The electric fan set 1 also comprises a motor support 11.

The motor support 11 has a general form extending along a main extension plane. The axis A is substantially orthogonal to this main extension plane of the motor support 11.

According to the embodiment illustrated in FIGS. 1 and 3, the motor support 11 has a generally substantially circular form.

The motor support 11 is for example produced in plastic material.

The motor support 11 defines an internal structure 13 for the fixing of the motor 3. In the example illustrated, the internal structure 13 delimits a central hole.

Moreover, the motor support 11 is preferably intended to be mounted on the housing of the heating, ventilation and/or air conditioning installation at a volute (not represented) ensuring the channelling of the air flow generated by the electric fan set 1. Advantageously, the motor support 11 comprises an outer ring 15 which is intended to be fixedly mounted on a housing (not represented) of the vehicle. The motor support 11, and in particular the outer ring 15, in this example forms an interface between the electric fan set 1 and the vehicle, notably the heating, ventilation and/or air conditioning installation of the vehicle.

Furthermore, the motor support 11 has, in this example, a top face 11*a* and an opposing bottom face 11*b*. The bottom face 11*b* of the motor support 11 is arranged here facing the fan wheel 5 (see FIG. 1).

The motor support 11 also has at least one fixing zone for the assembly of the motor support 11 with at least one other element of the electric fan set 1 as described hereinbelow.

According to the example illustrated in FIGS. 1 and 2, the electric fan set 1 further comprises a control module 17 of the motor 3.

Referring to FIGS. 1 and 2, the control module 17 comprises a control circuit 19 such as a printed circuit board, known by the acronym PCB, supporting a set of electrical and/or electronic components making it possible to drive the motor 3. The control module 17 comprises a predetermined number of terminals 20 connected to the motor 3 to power the windings of the motor 3. According to the non-limiting example represented, the control module 17 comprises three terminals 20 connected to the motor 3.

The control module 17 further comprises at least one electrical connector 21 intended to be linked to a wiring loom of the vehicle, notably to bring the energy and/or a control signal to the control circuit 19. In this example, the electrical connector 21 is borne by the control circuit 19 by extending in a direction B substantially at right angles to the longitudinal axis A of the motor 3. The electrical connector 21 therefore extends here radially relative to the longitudinal axis A of the motor 3. According to the embodiment described, the direction B of extension of the electrical connector 21 is substantially parallel to the main extension plane of the motor support 11.

The electric fan set 1 further comprises a control module support 23. The control module 17 is therefore arranged on this control module support 23, in other words the control circuit 19 and the electrical connector 21 are borne by this control module support 23.

It is possible also to provide a protective cover 25 arranged above the control circuit 19, so as to cover the components borne by the control circuit 19, and fixed to the control module support 23. This protective cover 25 has a form complementing the form of the control circuit 19.

The control module support 23 has a general form extending on a main extension plane which is parallel to the main extension plane of the motor support 11. The axis A is therefore also substantially orthogonal to the main extension plane of the control module support 23.

The control module support 23 is advantageously aligned with the motor support 11 on the axis A orthogonal to the main extension planes of these two supports 11 and 23.

According to the embodiment illustrated in FIGS. 1 and 2, the control module support 23 has a generally substantially circular form.

The control module support 23 in this example has a top face 23*a* and an opposing bottom face 23*b*.

The control module support 23 also has, in this example, a central hole. More specifically, according to the embodiment described, the control module support 23 also serves as bearing support for the motor 3. As can be better seen in FIG. 4, the control module support 23 to this end has a substantially cylindrical chamber 26 extending axially along the longitudinal axis A from the bottom face 23*b* of the control module support 23. The cylindrical chamber 26 is intended to receive an end (not visible in the figures) of the transmission shaft 4 of the motor 3, opposite the end of the transmission shaft 4 mounted on the fan wheel 5, and is therefore intended to serve as bearing support. The cylindrical chamber 26 is also intended to be received in the central hole of the motor support 11.

According to the example illustrated, the motor support 11 is arranged axially between the control module support 23 and the fan wheel 5. In this case, the top face 11*a* of the motor support 11 is arranged facing the control module support 23.

The electric fan set 1 can further comprise a cooling means 27 for the control module 17 of the motor 3, such as a heat sink 27, for discharging the heat produced by the electrical and/or electronic components borne by the control circuit 19.

According to the embodiment illustrated, the control module support 23 comprises such a cooling means 27 for the control module 17.

The control module support 23 is advantageously produced in aluminium.

Moreover, the control module 17 is mounted, in this example, on the top face 23*a* of the control module support 23. The control module 17 can be fixed by any appropriate means to the control module support 23, for example by screwing. The bottom face 23*b* of the control module support 23 can, for its part, be arranged facing the motor support 11. The control module 17 is therefore positioned on the control module support 23 on the side opposite the motor support 11.

According to the embodiment illustrated, the control module support 23 is rigidly linked to the stator of the motor 3.

Furthermore, the control module support 23 is assembled with the motor support 11. The control module support 23 is, for example, assembled with the motor support 11, by its bottom face 23*b* facing the motor support 11. More specifically, the control module support 23 is provided to cooperate with the internal structure 13 of the motor support 11.

Figure 4:
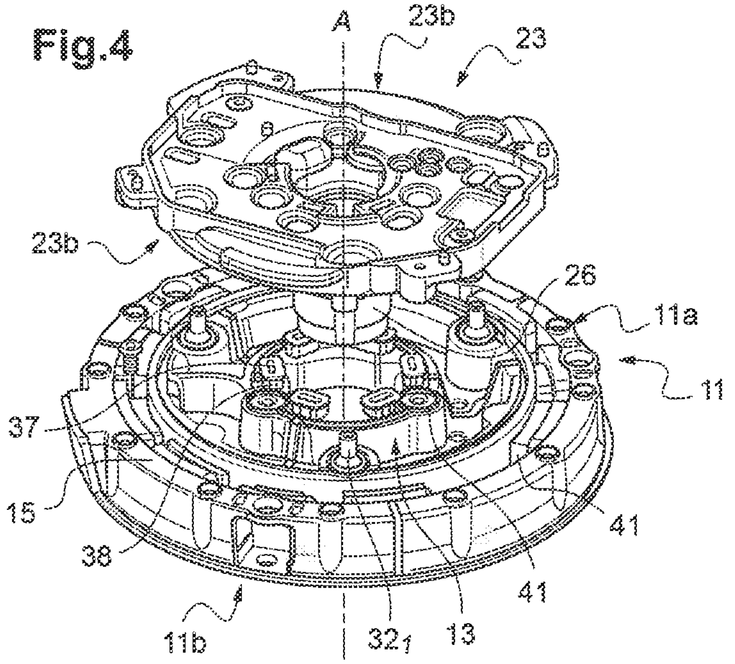

The assembly is done along the axis A orthogonal to the main extension planes of the two supports 11 and 23, as schematically represented in FIG. 4. The axis A is also designated assembly axis.

The motor support 11 and the control module support 23 are for example assembled with one another by assembly faces 11*a*, respectively 23*b*. The assembly face 11*a* of the motor support 11 extends along the main extension plane of the motor support 11. Similarly, the assembly face 23*b* of the control module support 23 extends along the main extension plane of the control module support 23. The assembly faces 11*a* and 23*b* therefore extend along planes that are parallel to one another and at right angles to the longitudinal axis A.

To this end, the control module support 23 has at least one fixing zone for the assembly with the motor support 11. The fixing zones on the one hand of the motor support 11 and on the other hand of the control module support 23 are capable of cooperating with one another for the assembly of the motor support 11 with the control module support 23, according to at least two different positions of the motor support 11 relative to the control module support 23. The fixing zones of the motor support 11 and of the control module support 23 are therefore complementary.

Obviously, the fixing zone of the motor support 11 comprises mounting elements and the fixing zone of the control module support 23 comprises mounting elements complementing the mounting elements of the fixing zone of the motor support 11.

The motor support 11 and the control module support 23 are therefore positioned relative to one another via their fixing zones.

Figure 5B:
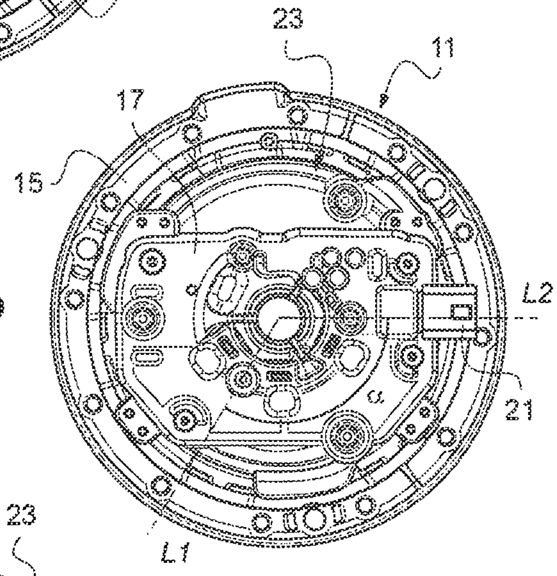
Figure 5C:
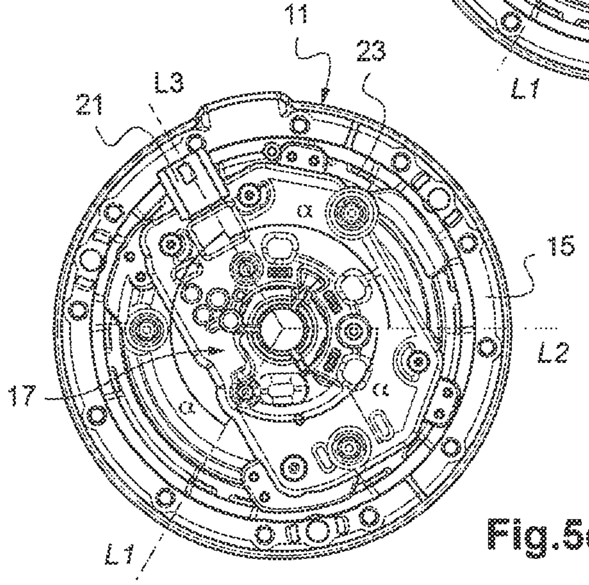

More specifically, the assembly of the control module support 23 with the motor support 11 can be done according to at least two different positions, preferably according to three different positions. By way of example, three assembly positions between the motor support 11 and the control module support 23 are illustrated in FIGS. 5*a* to 5*c*. In each position, the electrical connector 21 extends in a distinct direction L1, L2 or L3 which is therefore different depending on the assembly position chosen between the motor support 11 and the control module support 23.

Thus, upon assembly, a first assembly borne by the control module support 23 and a second assembly formed by the motor support 11 can be driven in rotation relative to one another to the assembly position chosen from the three possible assembly positions in this example. According to the embodiment described, the first assembly is represented in FIG. 2, and therefore comprises the control module support 23 and in particular the motor 3, the control module 17 with its control circuit 19 and the electrical connector 21, and the possible protective cover 25. The orientation of the first assembly relative to the second assembly is adjustable. The orientation of this first assembly is defined during assembly.

After assembly of the assembly formed by the control module support 23 and the elements that it bears, and the motor support 11, a cover 28 (see FIG. 1) of generally substantially circular form can also be arranged and fixed onto the motor support 11. The cover 28 is for example fixed at the outer ring 15 of the motor support 11.

Advantageously, in order to allow the motor support 11 to be assembled with the control module support 23 according to different assembly positions, the fixing zone of at least one of the supports 11 or 23 is invariant by rotation by a predefined angle α about the axis A substantially orthogonal to the main extension planes of the supports 11 and 23, as represented in FIGS. 5*a* to 8.

According to the embodiment illustrated, both the fixing zone of the motor support 11 and the fixing zone of the control module support 23 are invariant by rotation by a predefined angle α about the axis A. The angle α of invariance by rotation is the same for one or other of the fixing zones. In the example illustrated, it is an invariance by rotation of 120°.

Figure 6:
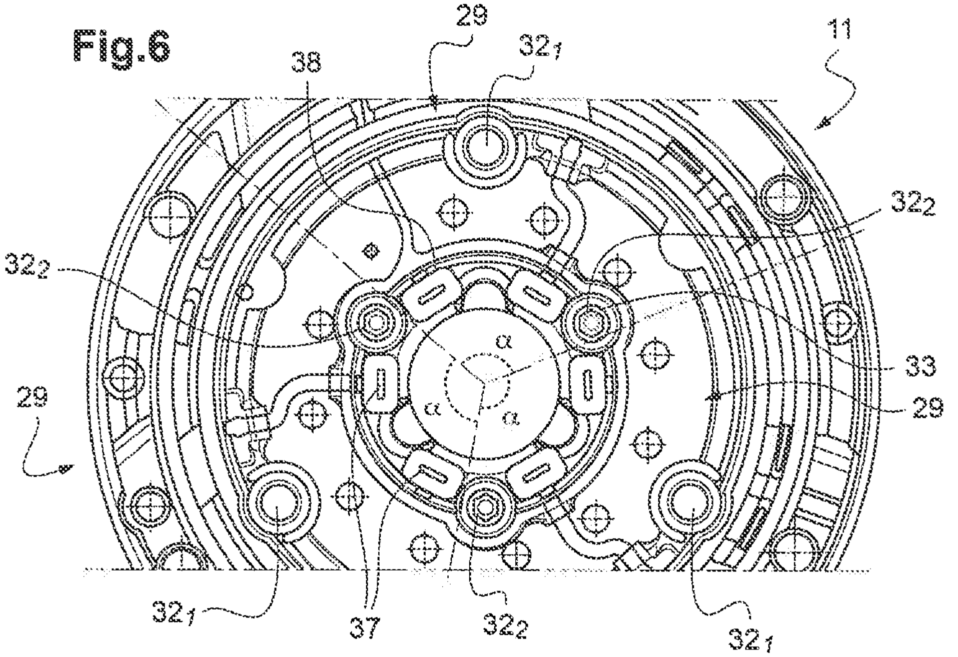
FIG. 6 is a plan view of the of the motor support of FIG. 3.

The fixing zone of the motor support 11 comprises at least one set of mounting elements 29 visible in FIG. 6. The expression "set of mounting elements" 29 or 31 here designates at least one mounting element or several mounting elements.

Figure 7:
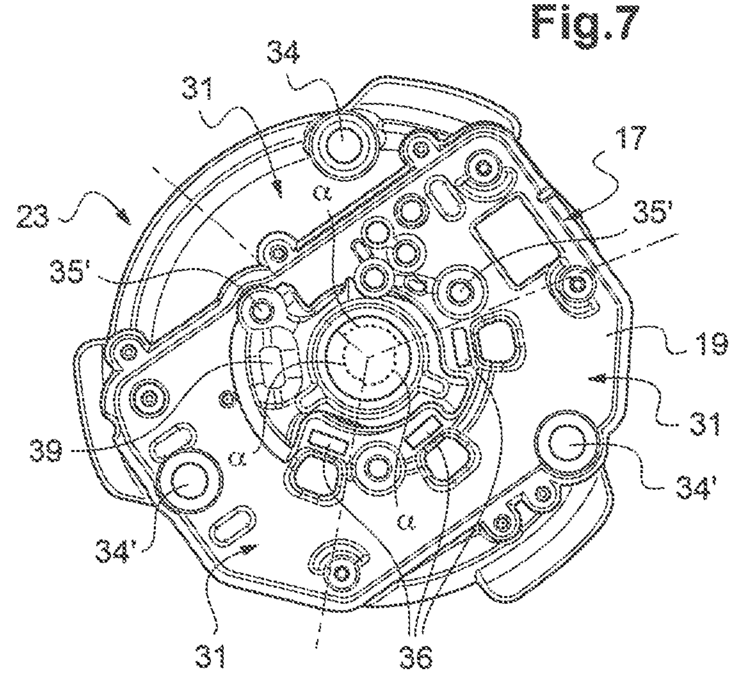
FIG. 7 is a plan view of the control module support of FIG. 2 bearing a control circuit of the motor of the electric fan set.
Figure 8:
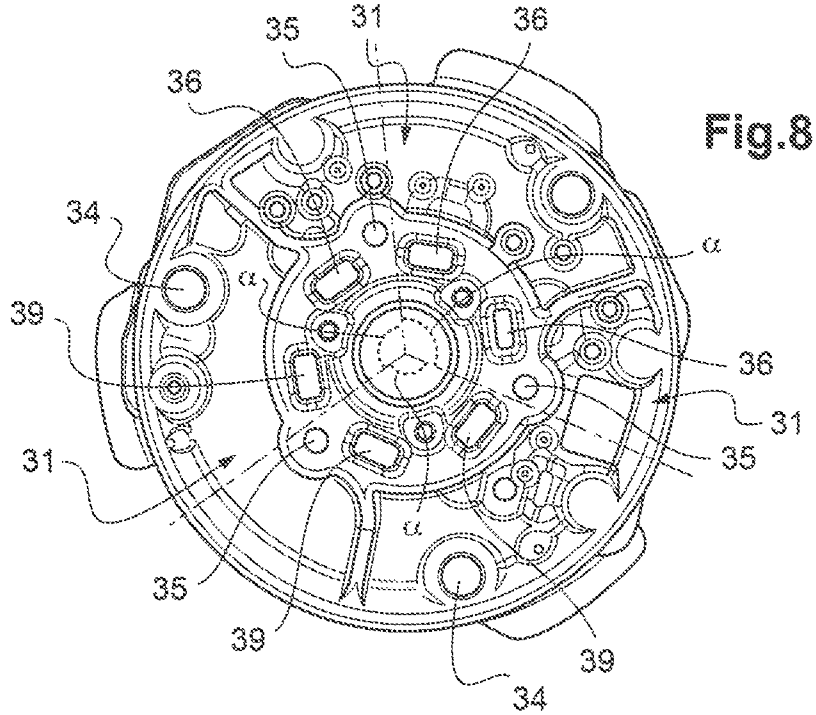
FIG. 8 is a view from below of the control module support of FIG. 7.

Similarly, the fixing zone of the control module support 23 comprises at least one set of mounting elements 31 visible in FIGS. 7 and 8.

In FIGS. 6 to 8, the sets of mounting elements 29, respectively 31, are delimited by dotted line axes.

Each set of mounting elements 29 or the at least one set of mounting elements 29 provided on the fixing zone of the motor support 11 is arranged facing a complementary set of mounting elements 31, provided on the fixing zone of the control module support 23, in the assembled state of the electric fan set 1.

Furthermore, as can be better seen in FIG. 7, the control module 17 is fixed to the control module support 23, and in particular in this example the control circuit 19 is fixed to the control module support 23 in a predefined position. The control circuit 19 at least partially covers the control module support 23. In this case, at least some mounting elements are formed jointly and complementarily on the control module support 23 and the control circuit 19. The sets of mounting elements 31 are therefore provided both on the control module 17, here in particular the control circuit 19, and on the control module support 23.

Moreover, referring once again to FIG. 6, the motor support 11 can comprise at least two sets of mounting elements 29.

In particular, one set of mounting elements 29 is the image of the other set of mounting elements 29 by rotation by the predefined angle α about the axis A. In particular, "image" should be understood to mean the "symmetrical image". In other words, the sequence of mounting elements of one set 29 is repeated by rotation by the predefined angle α about the axis A. These two sets of mounting elements 29 can be designated symmetrical sets of mounting elements.

The two sets of mounting elements 29 make it possible to assemble the motor support 11 and the control module support 23 together according to at least two different positions depending on the set of mounting elements chosen.

As a variant or in complement, it is the control module support 23 (see FIGS. 7 and 8) which comprises at least two sets of mounting elements 31, of which one is the image of the other by rotation by the predefined angle α about the axis A.

According to a preferred embodiment, the two supports, namely the motor support 11 on the one hand and the control module support 23 on the other hand, respectively comprise the same number of sets of mounting elements 29, respectively 31.

According to the embodiment illustrated in FIGS. 6 to 8, the motor support 11 comprises three sets of mounting elements 29 and the control module support 23 also comprises three sets of mounting elements 31. Each set of mounting elements 31 of the control module support 23 is arranged facing a complementary set of mourning elements 29 of the motor support 11 in the assembled state of the electric fan set 1.

According to this embodiment, the sets of mounting elements 29, respectively 31, are distributed according to a constant angular offset α on the fixing zone of the motor support 11, respectively of the control module support 23. The angular offset corresponds to the angle of invariance by rotation.

Furthermore, referring once again to FIGS. 6 to 8, the sets of mounting elements 29 of the fixing zone of the motor support 11 are for example distributed according to a same angular offset α as the sets of mounting elements 31 of the fixing zone of the control module support 23. Advantageously, the angular offset α is constant.

According to the particular example illustrated, the three sets of mounting elements 29 of the motor support 11 are distributed according to an angular offset α of the order of 120°, and the three sets of mounting elements 31 of the control module support 23 are distributed according to the same angular offset α of the order of 120°.

FIGS. 5*a* to 5*c* schematically illustrate the three possible assembly positions between the motor support 11 and the control module support 23 in this case.

FIG. 5*a* shows a first assembly position of the motor support 11 with the control module support 23, in which the electrical connector 21 extends in a first direction L1. FIG. 5*b* shows a second assembly position of the motor support 11 with the control module support 23, in which the electrical connector 21 extends in a second direction L2 different from the first direction L1 and here forming an angle α of the order of 120° relative to the first direction L1. Finally, FIG. 5*c* shows a third assembly position of the motor support 11 with the control module support 23, in which the electrical connector 21 extends in a third direction L3 different from the first direction L1 and different from the second direction L2. Furthermore, this third direction L3 here forms an angle α of the order of 120° relative to the first direction L1 and relative to the second direction L2.

To change from one configuration to another, it is sufficient to rotate the control module support 23 and the parts it bears relative to the motor support 11. Thus, the configuration illustrated in FIG. 5*b*, respectively 5*c*, is obtained from the same elements as the configuration illustrated in FIG. 5*a*, the only difference relative to the configuration of FIG. 5*a* being that the control module support 23 and the parts that it bears have undergone a rotation of the order of 120° (FIG. 5*b*), respectively 240° (FIG. 5*c*) about the assembly axis A.

Moreover, each set of mounting elements 29 of the motor support 11 and each set of mounting elements 31 of the control module support 23 comprises at least one mounting element for the assembly or more specifically the fixing of the motor support 11 to the control module support 23. In other words, at least some mounting elements are configured to allow the motor support 11 to be fixed to the control module support 23.

The mounting of the control module support 23 with the motor support 11 can be ensured by any appropriate mounting element, notably screws or screw-nut assemblies, or even hot-mounted rivets, which pass through openings of the fixing zones on each support, namely the motor support 11 and the control module support 23.

As a variant or in complement, the assembly between the motor support 11 and the control module support 23 can be done by material deformation in the facing complementary fixing zones of the motor support 11 and of the control module support 23.

As a non-limiting example, provision can be made for the motor support 11 and the control module support 23 to be assembled with one another by mounting elements which differ at their periphery and at their inner edge.

Referring to FIG. 6, the motor support 11 comprises, for example, first mounting elements $32_1$, such as fixing blocks $32_1$, at its periphery. The first mounting elements $32_1$, such as fixing blocks $32_1$, are for example made of a single piece with the motor support 11. The motor support 11 for example also comprises second mounting elements $32_2$, such as fixing screws or screw-nut assemblies, at the inner edge surrounding the central hole of the motor support 11, and associated orifices 33 of complementary form to receive the second mounting elements $32_2$. Each set of mounting elements 29 of the motor support 11 in this example comprises a first mounting element $32_1$, such as a fixing block $32_1$, and a second mounting element $32_2$, such as a screw received in an orifice 33.

Complementarily, the control module support 23 can be able to receive the first mounting elements $32_1$ at the periphery of the control module support 23 and the second mounting elements $32_2$ at the inner edge of the control module support 23. Referring to FIGS. 7 and 8, the control module support 23 to this end comprises first orifices 34 for the passage of the first mounting elements $32_1$, and second orifices 35 for the passage of the second mounting elements $32_2$.

Obviously, according to the exemplary embodiment illustrated in which the control circuit 19 is fixed to the control module support 23 by at least partially covering it, the control circuit 19 also comprises first orifices 34' for the passage of the first mounting elements $32_1$, and these first orifices 34' are associated and aligned with the first orifices 34 provided on the control module support 23 at the locations covered by the control circuit 19. Similarly, the control circuit 19 also comprises second orifices 35' for the passage of the second mounting elements $32_2$, and these second orifices 35' are associated and aligned with the second orifices 35 provided on the control module support 23 at the locations covered by the control circuit 19.

Each set of mounting elements 31 provided on the control module support 23 in this example comprises a first orifice 34 and a possible aligned and complementary first orifice 34' provided on the control circuit 19, the first orifice(s) 34 and 34' being intended to be passed through by a first mounting element $32_1$, such as a fixing block $32_1$, in the assembled state of the electric fan set 1, and each second fixing zone 31 further comprising a second orifice 35 provided on the control module support 23 and a possible aligned and complementary second orifice 35' provided on the control circuit 19, the second orifice(s) 35 and 35' being intended to be passed through by a second mounting element $32_2$, in the assembled state of the electric fan set 1.

The first mounting elements $32_1$, such as fixing blocks $32_1$, of the motor support 11 are, for example, intended to be deformed once they have passed through the orifices 34 and 34' of the control module support 23 and notably of the control circuit 19, to ensure a mechanical link between the motor support 11 and the control module support 23, for example according to a snap-riveting method.

Furthermore, at least some mounting elements of the fixing zones of the motor support 11 and of the control module support 23 are configured to allow the passage of the terminals 20 between the control module 17 and the motor 3.

In particular, at least some mounting elements of the set of mounting elements 29 of the motor support 11, and/or of the set of mounting elements 31 of the control module support 23, are configured to allow the passage of the terminals 20 between the control module 17 and the motor 3 through the motor support 11 and the control module support 23.

According to the embodiment illustrated, the control module support 23 comprises first openings 36, visible in FIG. 7, for the passage of the terminals 20. More specifically, the control module support 23 comprises as many first openings 36 as there are terminals 20. The form of the first openings 36 complements the form of the terminals 20.

Complementarily, the motor support 11 comprises second openings 37 for the passage of the terminals 20. The form of the second openings 37 complements the form of the terminals 20. In this case, the number of second openings 37 of the motor support 11 is determined according to the number of terminals 20 and the number of possible assembly positions between the motor support 11 and the control module support 23. According to the particular example described with three terminals 20 connected between the control module 17 and the motor 3, and in which the motor support 11 and the control module support 23 can be assembled together according to three different positions, the motor support 11 comprises six second openings 37 for the passage of the three terminals 20 according to the three possible assembly positions between the motor support 11 and the control module support 23.

Furthermore, as can be better seen in FIGS. 3 and 4, the motor support 11 can comprise parts 38 forming protuberances relative to the plane defined by the motor support 11, these protuberance-forming parts 38 extending towards the control module support 23 and having second openings 37 for the passage of the terminals 20.

Complementarily, the control module support 23 further comprises cavities 39 in which certain protruding parts 38 of the motor support 11 emerge. The cavities 39 have a bottom and are not open-ended. The parts 38 protruding from or jutting out from the motor support 11 are therefore intended to be engaged either in the first openings 36 of the control module support 23 or in the cavities 39 of the control module support 23. Obviously, the protruding parts 38 have forms complementing the first openings 36 on the one hand and the cavities 39 on the other hand of the control module support 23.

In effect, depending on the assembly position between the motor support 11 and the control module support 23 chosen, the terminals 20 pass through only some second openings 37 of the motor support 11, here three second openings 37, and therefore pass through only some protruding parts 38 of the motor support 11. The three other second openings 37 and therefore three other protruding parts 38 remain without terminals 20. Thus, according to the example illustrated, the protruding parts 38 of the motor support 11 having the three second openings 37 passed through by the three terminals 20 are arranged facing the three first openings 36 provided on the control module support 23, whereas the protruding parts 38 having the three second openings 37 without terminals 20 are arranged facing the cavities 39 of the control module support 23 such that these protruding parts 38 not passed through by the terminals 20 emerge in the cavities 39.

Moreover, according to the embodiment illustrated, the terminals 20 pass through the control module support 23 and the motor support 11 at their respective inner edge delimiting the central hole. It goes without saying that the first openings 36 and the cavities 39 of the control module support 23 are formed on the inner edge of the control module support 23 delimiting the central hole, more specifically of the cylindrical chamber 26. Complementarily, the second openings 37, notably provided on the protruding parts 38 of the motor support 11, are formed on the inner edge of the motor support 11 delimiting the central hole capable of receiving the cylindrical chamber 26.

The electric fan set 1 can also comprise at least one sealing means 41 that can be better seen in FIG. 4, arranged between the motor support 11 and the control module support 23.

The sealing means 41 is for example provided at the mounting elements $32_1$, $32_2$ between the motor support 11 and the control module support 23.

The sealing means 41 is also advantageously provided between the internal structure 13 of the motor support 11 allowing assembly with the control module support 23 and bearing the motor 3, and the outer ring 15 forming the interface with the heating, ventilation and/or air conditioning installation.

It is also possible to advantageously provide a sealing means 41 at the protruding parts 38 of the motor support 11, the sealing means 41 in this case coming into contact with the first openings 36 or the complementary cavities 39 provided on the control module support 23 in the assembled state of the electric fan set 1.

The sealing means 41 is, for example, made of elastomer material.

Furthermore, the sealing means 41 can be produced by an overmoulding of the motor support 11.

Thus, such an electric fan set 1 according to the invention makes it possible to assemble the motor support 11 and the control module support 23 according to a number of assembly positions, preferably three. The assembly position is chosen during assembly, and makes it possible to adapt the orientation of the control module support 23 relative to the motor support 11, and consequently adapt the orientation of the electrical connector 21 notably relative to the housing of the vehicle once the electric fan set 1 is mounted on the vehicle.

The invention therefore makes it possible to have several, preferably three, different positions of the electrical connector 21 without requiring a modification to the parts of the electric fan set 1, notably the motor support 11 or the interface with the housing of the vehicle formed by the outer ring 15 of the motor support 11 here, to adapt the electric fan set in terms of orientation of the electrical connector 21 once assembled on the vehicle.

The motor support 11 and the control module support 23 have, respectively, at least one fixing zone, and the fixing zones of the two supports 11 and 23 are complementary to one another, and comprise all the mounting functionalities making it possible to assemble the motor support 11 with the control module support 23, notably the sets of mounting elements 29, respectively 31, which are repeated by rotation about the assembly axis A, to make it possible to assemble the motor support 11 and the control module support 23 according to a number of positions, preferably three different assembly positions, which makes it possible to meet different needs of the motor vehicle constructor as to the layout of the electric fan set on the vehicle.

Furthermore, with a number of sets of mounting elements 29; 31 on the fixing zone of each support, namely, on the one hand, the motor support 11 and, on the other hand, the control module support 23, there are multiple fixing points and the assembly is more robust.

The invention claimed is:

1. An electric fan set for a motor vehicle heating, ventilation and/or air conditioning installation, comprising:
- a motor;
- a motor support; and
- a control module support that forms a bearing support for the motor, the control module support bearing a control module,
- wherein the motor support and the control module support each comprise a plurality of fixing zones,
- wherein the control module is structured to attach to the motor support in one of a plurality of possible assembly positions comprising:
  - a first assembly position using a first combination of the plurality of fixing zones, and
  - a second assembly position different from the first assembly position using a second combination of the plurality of fixing zones different from the first combination of the plurality of fixing zones, and
- wherein the motor support is disposed directly between:
  - a first surface of the control module support opposite to a second surface of the control module support that bears the control module, and
  - a surface of the motor that is connected to a predetermined number of terminals of the control module.

2. The electric fan set according to claim 1, wherein the motor support and the control module support have parallel main extension planes, and the fixing zones of at least one of the supports is invariant by rotation by a predefined angle about an axis substantially orthogonal to the main extension planes.

3. The electric fan set according to claim 2, wherein the fixing zones of the motor support and the control module support are invariant by rotation by a predefined angle about the axis substantially orthogonal to the main extension planes.

4. The electric fan set according to claim 2, wherein the predefined angle is 120°.

5. The electric fan set according to claim 2, wherein the fixing zones of the motor support and/or of the control module support comprise at least two sets of mounting elements, each set of mounting elements being the image of another set of mounting elements by rotation by the predefined angle about the axis substantially orthogonal to the main extension planes.

6. The electric fan set according to claim 2, wherein:
- the control module support bears at least one electrical connector extending substantially parallel to the main extension plane of the control module support, and the fixing zones of the motor support and of the control module support are configured such that the electrical connector extends in a distinct direction in at least one of a plurality of assembly positions of the motor support and of the control module support.

7. The electric fan set according to claim 1, wherein the control module support bears a control circuit, and in which the fixing zones of the control module support comprise mounting elements arranged jointly on the control module support and on the control circuit.

8. The electric fan set according to claim 1, wherein the fixing zones of the motor support and of the control module support have complementary mounting elements, of which at least some are configured to allow the motor support to be fixed to the control module support and are chosen from the following list: screws, screw-nut assemblies, rivets, orifices, fixing blocks.

9. The electric fan set according to claim 1, wherein:
the control module support bears the control module comprising the predetermined number of terminals connected to the motor, and
the fixing zones of the motor support and of the control module support have complementary mounting elements, of which at least some are configured to allow the passage of the terminals through the motor support and the control module support.

10. The electric fan set according to claim 9, wherein:
the control module support comprises first openings for the passage of the terminals, there being the same number of first openings as there are terminals, and
the motor support comprises second openings for the passage of the terminals, the number of second openings of the motor support being determined according to the number of terminals and the number of possible assembly positions between the motor support and the control module support.

11. The electric fan set according to claim 10, wherein:
the motor support comprises parts forming protuberances relative to the motor support and extending towards the control module support, said protruding parts having second openings for the passage of the terminals, and
the control module support further comprises cavities in which certain protruding parts of the motor support emerge.

12. The electric fan set according to claim 1, wherein the motor is a brushless motor or an electrically switched motor.

13. A heating, ventilation and/or air conditioning installation for a motor vehicle, comprising:
at least one electric fan set comprising:
a motor;
a motor support; and
a control module support that forms a bearing support for the motor,
wherein the control module support bears a control module,
wherein the motor support and the control module support each comprise a plurality of fixing zones,
wherein the control module is structured to attach to the motor support in one of a plurality of possible assembly positions comprising:
a first assembly position using a first combination of the plurality of fixing zones, and
a second assembly position different from the first assembly position using a second combination of the plurality of fixing zones different from the first combination of the plurality of fixing zones, and
wherein the motor support is disposed directly between:
a first surface of the control module support opposite to a second surface of the control module support that bears the control module, and
a surface of the motor that is connected to a predetermined number of terminals of the control module.

14. An electric fan set for a motor vehicle heating, ventilation and/or air conditioning installation, comprising:
a motor;
a motor support; and
a control module support that forms a bearing support for the motor,
wherein the control module support bears a control module,
wherein the motor support and the control module support each comprise a plurality of fixing zones,
wherein the control module is structured to attach to the motor support in one of a plurality of possible assembly positions comprising:
a first assembly position using a first combination of the plurality of fixing zones, and
a second assembly position different from the first assembly position using a second combination of the plurality of fixing zones different from the first combination of the plurality of fixing zones,
wherein the motor support is disposed directly between:
a first surface of the control module support opposite to a second surface of the control module support that bears the control module, and
a surface of the motor that is connected to a predetermined number of terminals of the control module,
wherein the control module support bears the control module comprising the predetermined number of terminals connected to the motor,
wherein the fixing zones of the motor support and of the control module support have complementary mounting elements, of which at least some are configured to allow the passage of the terminals through the motor support and the control module support,
wherein the control module support comprises first openings for the passage of the terminals, there being the same number of first openings as there are terminals,
wherein the motor support comprises second openings for the passage of the terminals, the number of second openings of the motor support being determined according to the number of terminals and the number of possible assembly positions between the motor support and the control module support,
wherein the motor support comprises parts forming protuberances relative to the motor support and extending towards the control module support, said protruding parts having second openings for the passage of the terminals, and
wherein the control module support further comprises cavities in which certain protruding parts of the motor support emerge.

* * * * *